United States Patent
Chae et al.

(10) Patent No.: US 10,980,020 B2
(45) Date of Patent: Apr. 13, 2021

(54) METHOD AND DEVICE FOR PERFORMING SUBFRAME-TYPE-RELATED TRANSMISSION/RECEPTION IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 16/478,284

(22) PCT Filed: Jan. 22, 2018

(86) PCT No.: PCT/KR2018/000933
§ 371 (c)(1),
(2) Date: Jul. 16, 2019

(87) PCT Pub. No.: WO2018/135911
PCT Pub. Date: Jul. 26, 2018

(65) Prior Publication Data
US 2019/0364562 A1 Nov. 28, 2019

Related U.S. Application Data

(60) Provisional application No. 62/448,403, filed on Jan. 20, 2017.

(51) Int. Cl.
*H04W 56/00* (2009.01)
*H04W 72/04* (2009.01)
(Continued)

(52) U.S. Cl.
CPC ....... *H04W 72/0446* (2013.01); *H04L 1/1819* (2013.01); *H04L 5/0055* (2013.01);
(Continued)

(58) Field of Classification Search
CPC ..... H04W 72/0446; H04W 72/720406; H04W 72/0466; H04W 4/40; H04L 1/1819; H04L 5/0055
(Continued)

(56) References Cited

U.S. PATENT DOCUMENTS

2013/0336177 A1* 12/2013 Gao ................ H04L 5/1476
370/280
2014/0198733 A1 7/2014 Yin et al.
(Continued)

FOREIGN PATENT DOCUMENTS

| WO | WO2015122630 | 8/2015 |
| WO | WO2015152581 | 10/2015 |
| WO | WO2016037516 | 3/2016 |

OTHER PUBLICATIONS

NPL search history (Year: 2020).*
(Continued)

*Primary Examiner* — Sai Ming Chan
(74) *Attorney, Agent, or Firm* — Fish & Richardson P.C.

(57) ABSTRACT

One embodiment of the present invention relates to a method whereby a first terminal performs transmission or reception in a subframe in a wireless communication system, the subframe-type-related transmission/reception method comprising the steps of: determining to which a first subframe belongs among a plurality of subframe types; and performing either uplink transmission or downlink reception in an uplink resource or a downlink resource which is determined based on the determined type, wherein to which of the plurality of subframe types the first subframe belongs is indicated in each of K (K>1) subframes from the Lth (L>0) subframe in front of the first subframe, and each of the K subframes indicates to which of the plurality of subframe types K subframes from the Lth subframe therebehind (Continued)

belong. The first terminal is included in an autonomous vehicle.

14 Claims, 12 Drawing Sheets

(51) Int. Cl.
    *H04L 1/18* (2006.01)
    *H04L 5/00* (2006.01)
    *H04W 4/40* (2018.01)

(52) U.S. Cl.
    CPC ..... *H04W 56/001* (2013.01); *H04W 72/0406* (2013.01); *H04W 72/0466* (2013.01); *H04W 4/40* (2018.02)

(58) Field of Classification Search
    USPC .......................................................... 370/329
    See application file for complete search history.

(56) References Cited

U.S. PATENT DOCUMENTS

| | | | |
|---|---|---|---|
| 2016/0309464 A1 | 10/2016 | Mukherjee et al. | |
| 2017/0280430 A1* | 9/2017 | Yin | H04W 76/16 |
| 2018/0279149 A1* | 9/2018 | Li | H04W 72/0446 |
| 2019/0109677 A1* | 4/2019 | Wang | H04L 5/001 |

OTHER PUBLICATIONS

LG Electronics, "Remaining details on Frame Structure," R1-1611780, 3GPP TSG RAN WG1 Meeting #87, Reno, USA, dated Nov. 14-18, 2016, 6 pages.
ZTE, ZTE Microelectronics, "Discussion on dynamic TDD operations," R1-1612158, 3GPP TSG RAN WG1 Meeting #87, Reno, USA, dated Nov. 14-18, 2016, 3 pages.
Extended European Search Report in European Application No. 18742264.7, dated Oct. 2, 2020, 9 pages.
Intel Corporation, "Subframe structure for NR dynamic TDD," R1-1612005, 3GPP TSG RAN1 WG Meeting #87, Reno, Nevada, USA, dated Nov. 14-18, 2016, 8 pages.
Japanese Office Action in Japanese Application No. 2019-539250, dated Oct. 2, 2020, 7 pages (with English translation).
MediaTek Inc., "Flexible Frame Structure for New Radio Access Technology," R1-165163, 3GPP TSG RAN WG1 Meeting #85, Nanjing, China, dated May 23-27, 2017, 5 pages, XP055568066.
Nokia, Alcatel-Lucent Shanghai Bell, "Native sidelink support in flexible frame structure for NR," R1-167268, 3GPP TSG-RAN WG1#86, Gothenburg, Sweden, dated Aug. 22-26, 2016, 7 pages.
Ericsson, "Contents of PSBCH for V2X," R1-1612936, 3GPP TSG RAN WG1 Meeting #87, Reno, Nevada, USA, Nov. 14-18, 2016, 2 pages.
Huawei, HiSilicon, "Remaining details on V2V SLSS/PSBCH transmission," R1-1611190, 3GPP TSG RAN WG1 Meeting #87, Reno, USA, Nov. 14-18, 2016, 2 pages.
PCT International Search Report and Written Opinion in International Application No. PCT/KR2018/000933, dated Apr. 20, 2018, 15 pages (with English translation).

* cited by examiner

FIG. 5
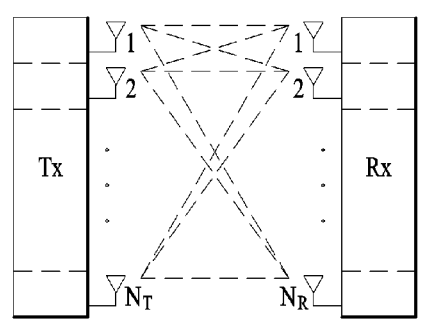
(a)
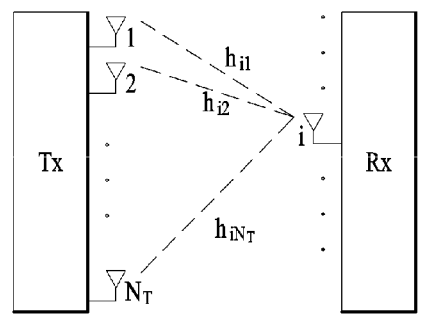
(b)

FIG. 8
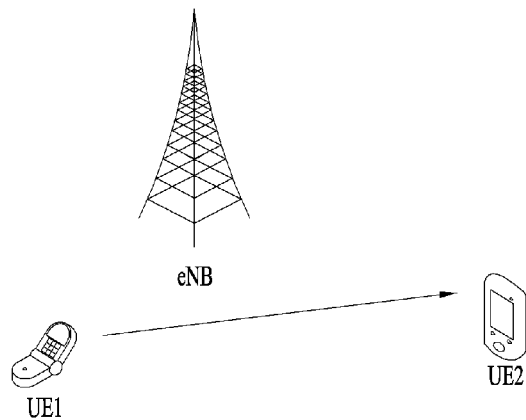
(a)
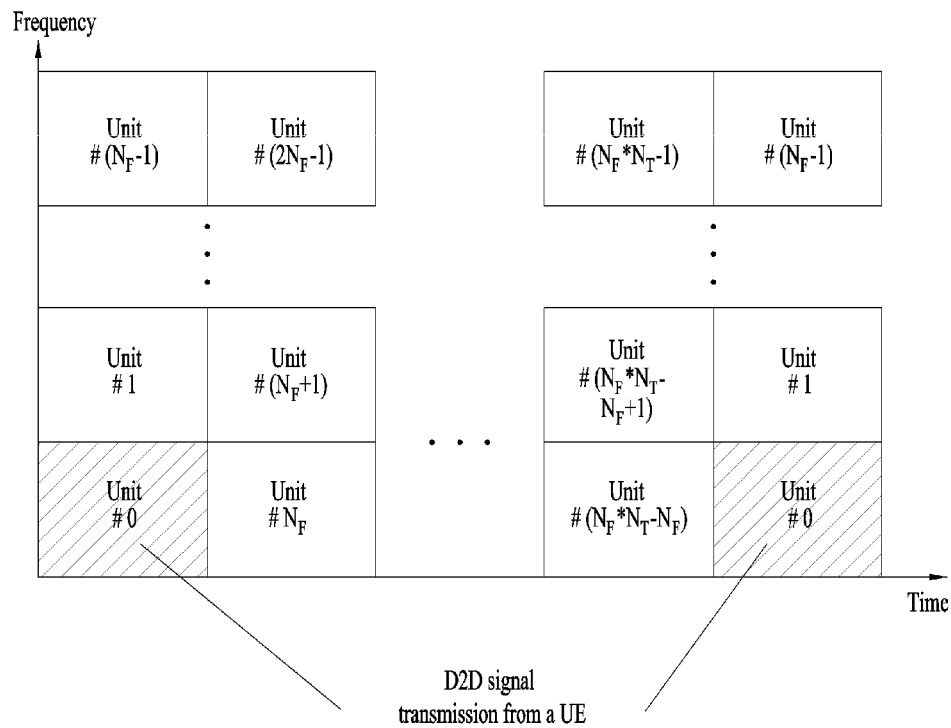
(b)

METHOD AND DEVICE FOR PERFORMING SUBFRAME-TYPE-RELATED TRANSMISSION/RECEPTION IN WIRELESS COMMUNICATION SYSTEM

CROSS-REFERENCE TO RELATED APPLICATIONS

This application is a National Stage application under 35 U.S.C. § 371 of International Application No. PCT/KR2018/000933, filed on Jan. 22, 2018, which claims the benefit of U.S. Provisional Application No. 62/448,403, filed on Jan. 20, 2017. The disclosures of the prior applications are incorporated by reference in their entirety.

TECHNICAL FIELD

The present disclosure relates to a wireless communication system, and more particularly, to a method and apparatus for performing transmission and reception in relation to a subframe type.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to provide a method of performing signal transmission and reception according to a subframe type by a user equipment (UE), the subframe type being indicated dynamically.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of performing transmission or reception in a subframe by a first user equipment (UE) in a wireless communication system includes determining a subframe type of a first subframe from among a plurality of subframe types, and performing one of uplink transmission and downlink reception in an uplink resource or a downlink resource according to the determined subframe type. The subframe type of the first subframe among the plurality of subframe types is indicated by each of K (K>1) subframes earlier than the first subframe by L (L>0) subframes, and each of the K subframes indicates the subframe types of K subframes after L subframes among the plurality of subframe types.

A first UE for performing transmission or reception in a subframe in a wireless communication system includes a transmitter, a receiver, and a processor. The processor is configured to determine a subframe type of a first subframe from among a plurality of subframe types, and to perform one of uplink transmission and downlink reception in an uplink resource or a downlink resource according to the determined subframe type. The subframe type of the first subframe among the plurality of subframe types is indicated by each of K (K>1) subframes earlier than the first subframe by L (L>0) subframes, and each of the K subframes indicates the subframe types of K subframes after L subframes among the plurality of subframe types.

An index of the first subframe may be determined to be a next index to an index of a transmitted subframe shortly previous to the first subframe among subframes of the determined subframe type.

A measurement result of the first UE may also be used in a next index to the determined index.

The determined index may be used to determine a hybrid automatic repeat request (HARQ) acknowledgment/negative acknowledgment (ACK/NACK) transmission subframe.

The determined index may be used to reserve sidelink resources.

The determined index may be used to generate a reference signal sequence or a scrambling sequence.

If the first UE is an out-coverage UE, a UE transmitting a synchronization signal may transmit an indication indicating the subframe type of the first subframe among the plurality of subframe types.

The indication may be transmitted on a physical sidelink broadcast channel (PSBCH).

The PSBCH may be transmitted in the K subframes earlier than the first subframe by L subframes.

Each of the plurality of subframe types may include two or more of a downlink resource region, an uplink resource region, a downlink control information region, an uplink control information region, and a guard period.

Each of the plurality of subframe types may have a different subframe structure.

Information indicating the subframe type of the first subframe may be transmitted in one or more resource elements (REs) of the K subframes earlier than the first subframe by L subframes.

Advantageous Effects

According to the present disclosure, an evolved Node B (eNB) may dynamically configure a subframe type, and a user equipment (UE) may overcome timing ambiguity caused by a midway change of a subframe type. Further, compared to long term evolution (LTE) release 12, the eNB does not need to signal a long resource pool bitmap for a sidelink, thereby reducing higher-layer control signal overhead.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE FOR CARRYING OUT THE INVENTION

Figure 1:
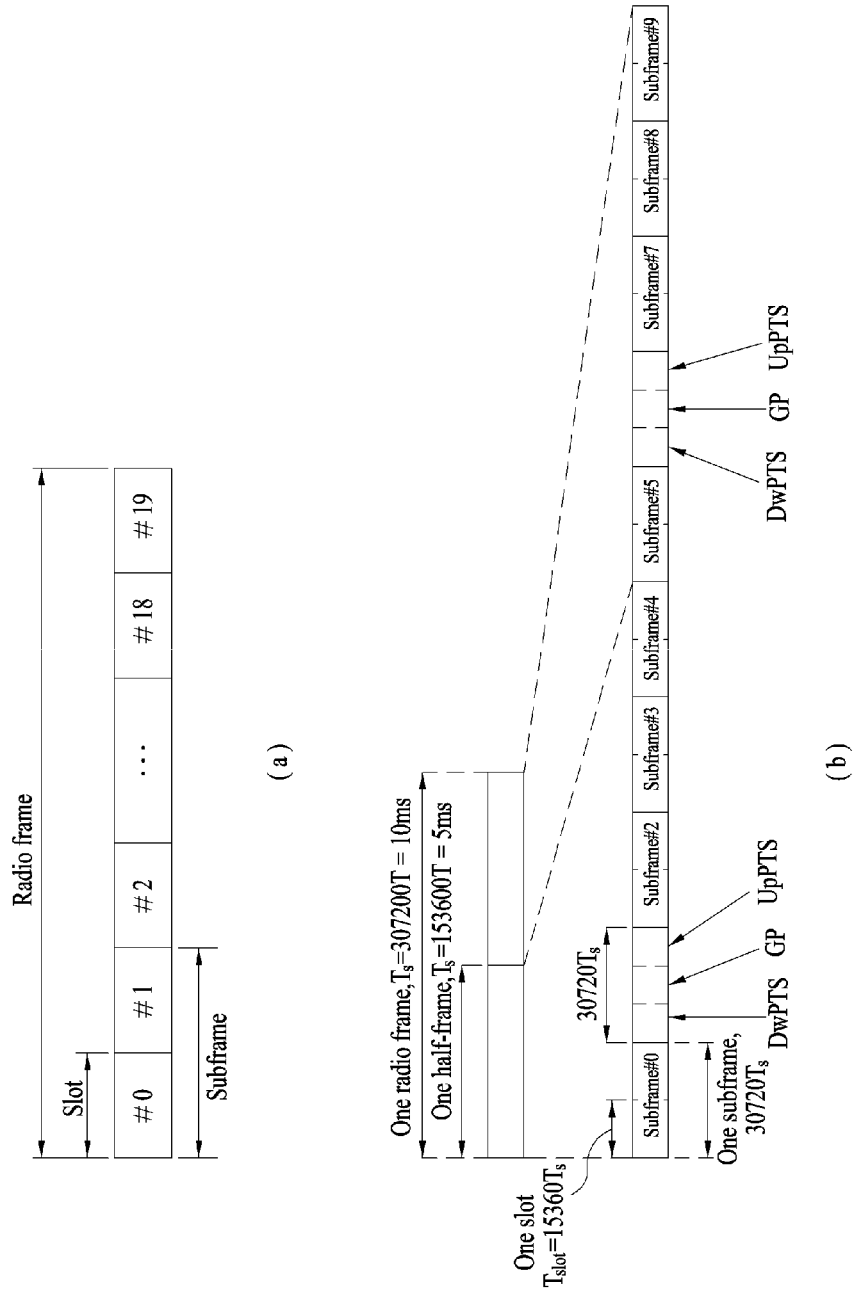
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS).

3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus, when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
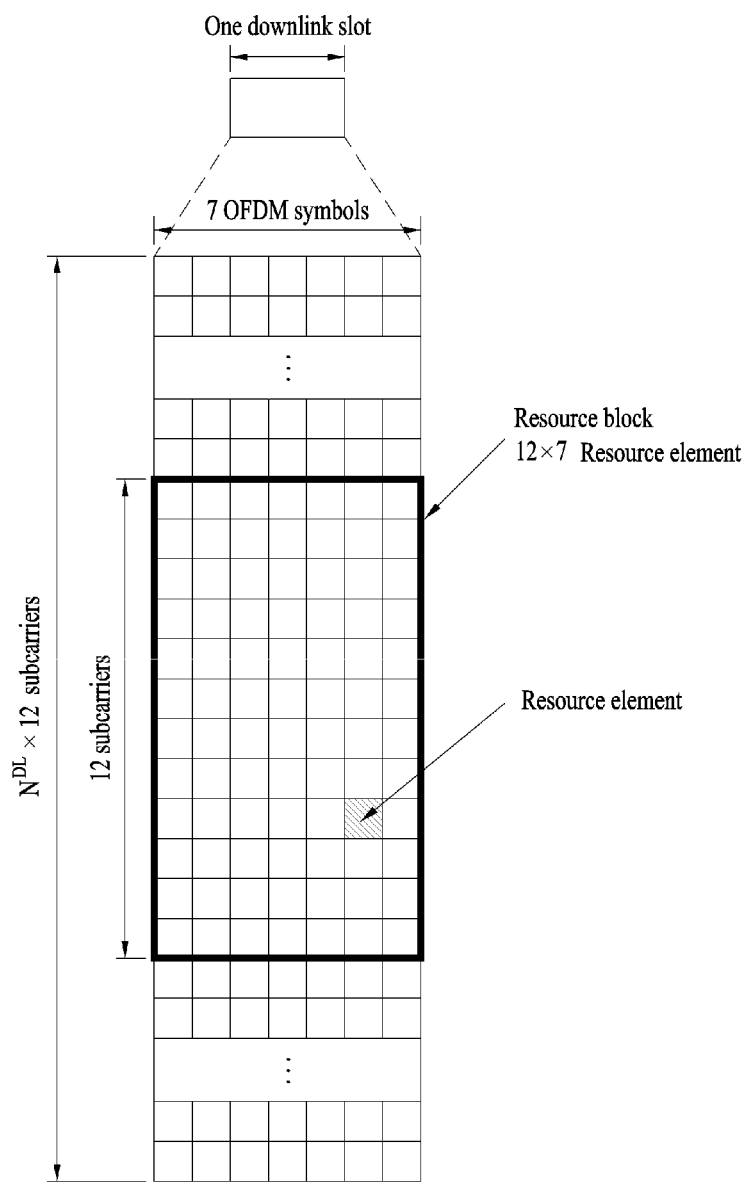
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
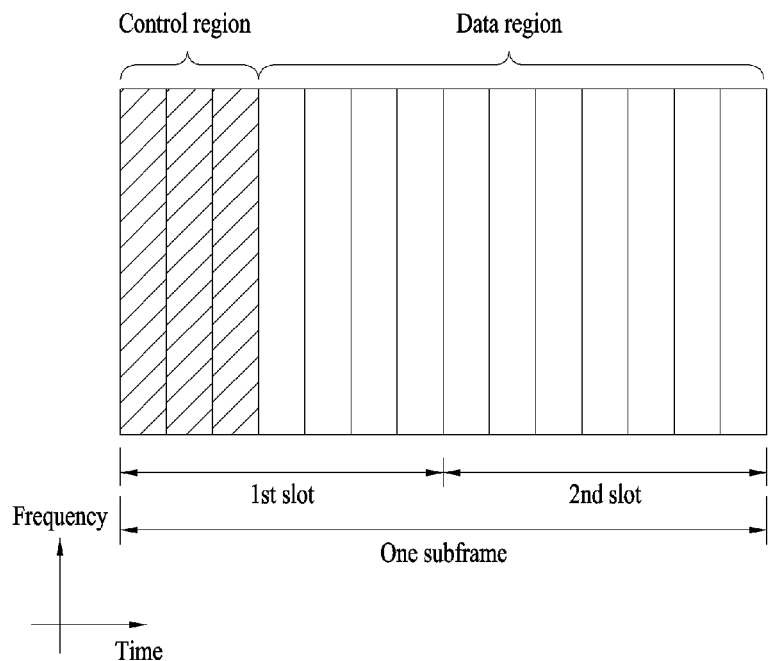
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
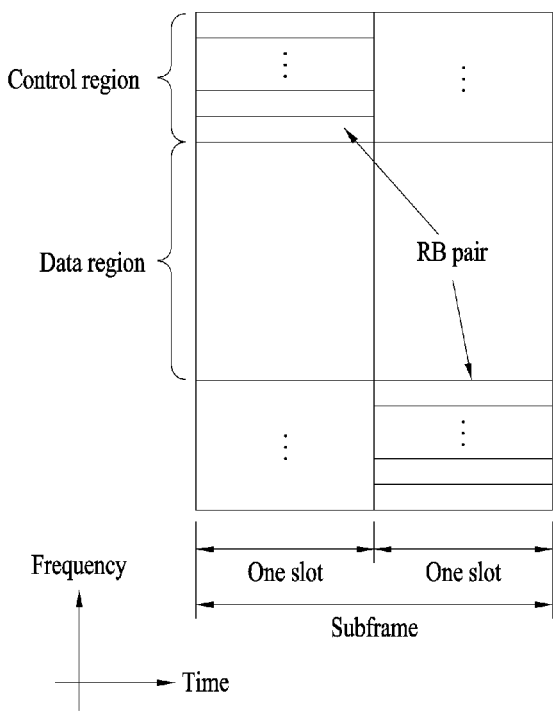
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus, it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MB SFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in a MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in a MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots x_{N_T}$ which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

[Equation 10]

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
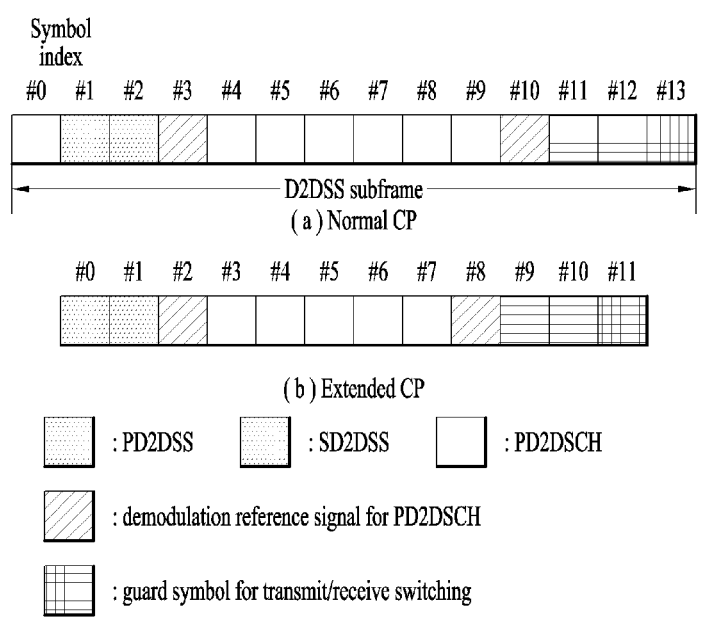
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
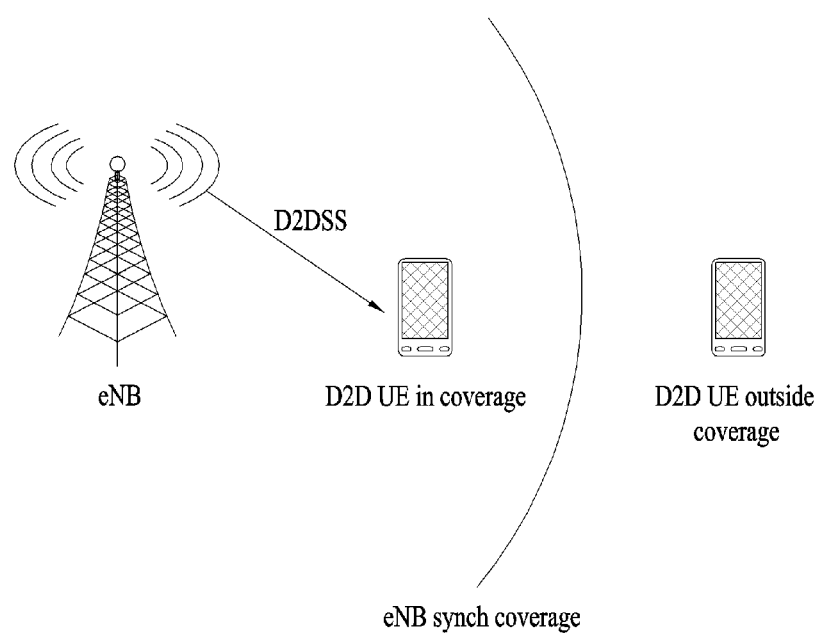
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, a SA resource pool may correspond to a pool of resources that a SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If a SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of a SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit a SA (D2D control signal, or sidelink control information (SCI)) in resources configured by an eNB. For a mode-2 UE, the eNB configures resources for D2D transmission. The mode-2 UE may select time-frequency resources from the configured resources and transmit a SA in the selected time-frequency resources.

Figure 9:
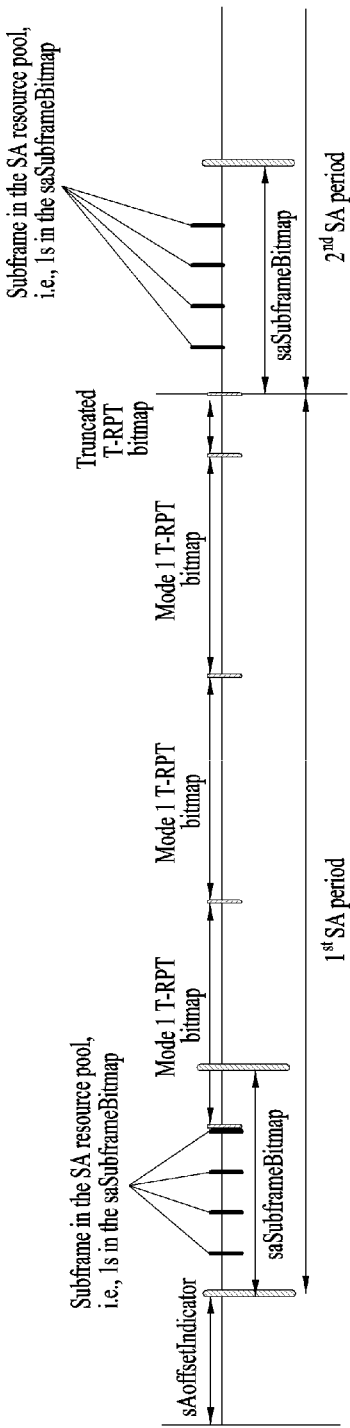
FIG. 9 is a view illustrating a scheduling assignment (SA) period.

A SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include a SA resource pool and a subframe pool for D2D data transmission. The SA resource pool may include the first subframe of the SA period to the last of subframes indicated as carrying a SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in a SA period except for a SA resource pool is larger than the number of T-RPT bits, the T-RPT may be applied repeatedly, and the last applied T-RPT may be truncated to be as long as the number of remaining subframes. A transmitting UE performs transmission at positions corresponding to 1s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 10:
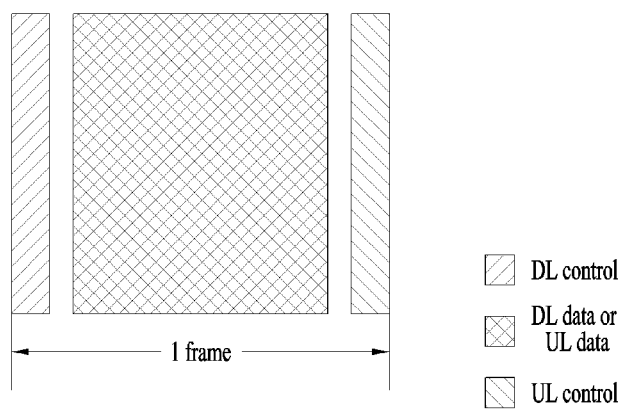
FIGS. 10 and 11 are views illustrating exemplary frame structures.

FIG. 10 illustrates an exemplary frame structure available for NR. Referring to FIG. 10, the frame structure is characterized by a self-contained structure in which all of a DL control channel, DL or UL data, and a UL control channel are included in one frame unit. The DL control channel may deliver DL data scheduling information, UL data scheduling information, and so on, and the UL control channel may deliver ACK/NACK information for DL data, CSI (modulation and coding scheme (MCS) information, MIMO transmission-related information, etc.), a scheduling request, and so on. A time gap for DL-to-UL or UL-to-DL switching may be defined between a control region and a data region. A part of a DL control channel, DL data, UL data, and a UL control channel may not be configured in one frame. Further, the sequence of channels in one frame may be changed (e.g., DL control/DL data/DL control/UL data, UL control/UL data/DL control/DL data, or the like).

In the current LTE system, a configuration is set on a radio frame basis, and each subframe is defined as a UL, DL, or special subframe in the configuration. In D2D communication, a resource pool bitmap is applied to UL subframes, whereas in V2V communication, a resource pool bitmap is applied to subframes other than DL, S, and synch subframes. The operation of changing a configuration on a radio frame basis has limitations in immediately changing a subframe to an intended subframe type. As different configurations specify different subframe types, a timeline (for HARQ, CSI feedback, etc.) should be newly configured for each subframe type. For example, when a configuration is changed, the same type of subframe may not come N subframes later. Therefore, the same type of subframe should be awaited after the N subframes, or a specific behavior should be dropped. In this context, a description will be given of a method of more dynamically allocating UL/DL/SL resources by changing a radio frame-wise configuration and thus granting freedom to a network.

Embodiment

The term as used herein, subframe type may refer to a subframe structure including two or more of a DL resource region, a UL resource region, a DL control information region, a UL control information region, and a guard period, and a plurality of subframes may have different subframe structures. That is, a subframe type is the composition of a subframe with a different UL/DL configuration. In other words, different subframe types have different UL/DL configurations. Further, if subframes differ in some of specific parameters for the subframes, the subframes may be defined as different subframe types.

Figure 11:
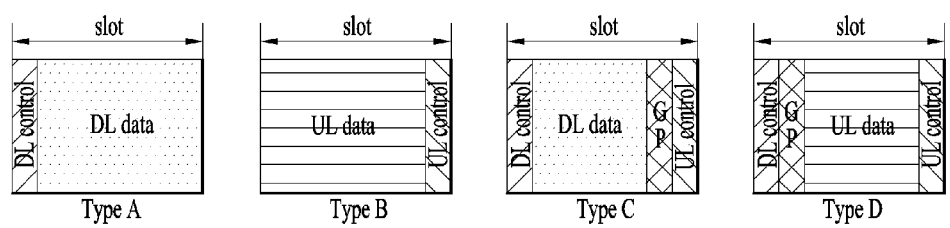

FIG. 11 is an exemplary view illustrating such subframe types. However, the present disclosure is not limited to the four types illustrated in FIG. 11, and different subframe types from those of FIG. 11 may be configured, each including one or more of a DL resource region, a UL resource region, a DL control information region, a UL control information region, and a guard period. Subframe types may be predefined. For example, N subframes types, subframe type 1 to subframe type N may be configured. Some subframe types may be grouped into one subframe type group. For example, subframe type 1 to subframe type N may be defined as a cellular subframe group, and subframe types x and y may be defined as a sidelink subframe group. Subframe types may be preset, or specific parameters (e.g., the sizes (in symbols) of a DL control region, a UL control region, a guard period, a DL data region, and a UL control region) for a specific subframe type may be indicated directly by an eNB or a UE. Further, subframe types may be grouped into subframe groups, and the subframe types of each subframe group may be preset or signaled to a UE by physical-layer signaling or higher-layer signaling.

Subframe Types/Groups

According to an embodiment of the present disclosure, a first UE may determine the subframe type of a first subframe from among a plurality of subframe types, and perform one of UL transmission and DL reception in a UL resource or a DL resource according to the determined subframe type. The subframe type of the first subframe among the plurality of subframe types may be indicated by each of K (K>1) subframes earlier than the first subframe by L (L>0) subframes, and each of the K subframes may indicate the subframe types of K subframes after L subframes. In other words, subframe types/groups indicated in an $n^{th}$ subframe may for an $(n+a)^{th}$ subframe to an $(n+b)^{th}$ subframe (a<b where a and b are 0 or a larger integer).

Figure 12:
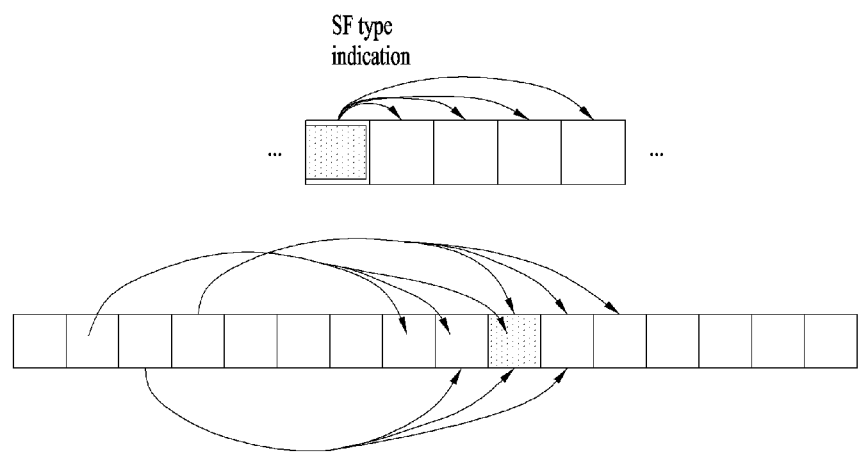
FIGS. 12, 13 and 14 are views referred to for describing an embodiment of the present disclosure.

That is, this method may seem to indicate subframe types/groups in a sliding window manner. That is, if the $n^{th}$ subframe indicates the subframe types/groups of the $(n+a)^{th}$ to $(n+b)^{th}$ subframes, the $(n+1)^{th}$ subframe indicates the subframe types/groups of $(n+1+a)^{th}$ to $(n+1+b)^{th}$ subframes. An example of this method is illustrated in FIG. 12(a), where a=0, b=4, L=1, and K=4. In FIG. 12(b), a=5, b=3, L=5, and K=3. In FIG. 12, a shaded subframe corresponds to the first subframe.

As such, since a plurality of subframes before the $(n+b)^{th}$ subframe indicate the subframe type/group of the $(n+b)^{th}$ subframe, a UE may operate actively in spite of failure in receiving a subframe type/group indication in a specific subframe. Further, an eNB may configure a subframe type more dynamically, and the UE may overcome timing ambiguity caused by a midway change of a subframe type. Further, compared to LTE release 12, the eNB has no need for signaling a long resource pool bitmap for a sidelink, thereby reducing higher-layer control signal overhead.

Figure 13:
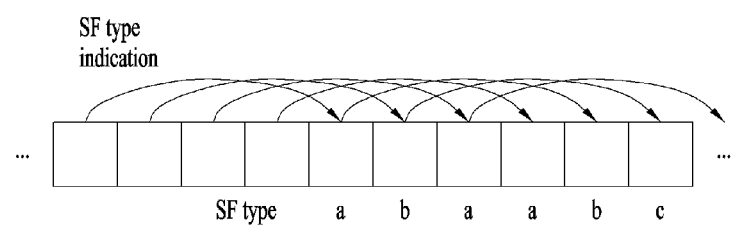
Figure 14:
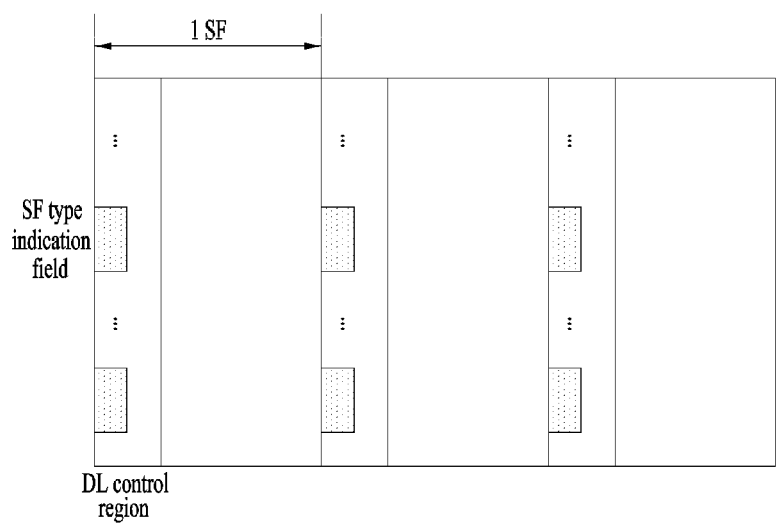

Apart from the foregoing sliding window method, the subframe type/group of a subframe may be indicated by the very previous subframe. While this subframe type/group indication information may be transmitted in each subframe, if a subframe is not available for the eNB to indicate a subframe type/group (on DL) (e.g., type B may not have a DL control region in FIG. 10), another subframe may indicate the subframe type/group. That is, a specific subframe may indicate the subframe type/group of a subframe after a few subframes. That is, a subframe type/group indication in a specific subframe may indicate the subframe type/group of a subframe after N subframes. In FIG. 13, a subframe type/group indication in a specific subframe indicates the subframe type/group of a subframe after four subframes. As described above, a specific subframe may not be available in directly indicating the subframe type/group of a subframe in view of the type of the specific subframe. In this case, any of subframes available for subframe type/group indication before the specific subframe may indicate the subframe type/group preliminarily/instead of the specific subframe.fsliding Subframe type/group indication information/indicator is transmitted/or indicates a subframe type/group in a subframe according to the foregoing methods. As illustrated in FIG. 14, a subframe type/group may be indicated in some REs of a DL control region, such as a PCFICH. The REs for the subframe type/group indication may carry a codeword obtained by encoding specific information or a sequence obtained by mapping the specific information to a specific sequence. For example, in the case of a codeword, the REs may be a PBCH or a UE-common PDCCH. In another method, for a specific subframe type/group, the eNB may signal subframe type/group information in a region (e.g., a part of a UL data region) other than the DL control region. The eNB may indicate the subframe type/group of every subframe in these methods.

In further consideration of overhead, the eNB may signal the subframe types/groups or subframe indexes of upcoming subframes only in a subframe every predetermined period, instead of transmitting a subframe type/group or a subframe index in each subframe. For example, the eNB may signal subframe types/groups or subframe indexes for upcoming M ms only in a subframe every N ms. The eNB may set M to be equal to or larger than N, thus compensating for loss of a subframe which signals a subframe type/group and/or a subframe index. M and N may be signaled to the UE by physical-layer signaling or higher-layer signaling.

In another method, a subframe index may be indicated by a frequency shift of an RS. The eNB may signal, to the UE, a seed ID used for generation of an RS or a scrambling sequence in a DL control region in every subframe or every N subframes. In this manner, a legacy cell ID-based RS generation scheme is avoided, and the eNB may change an RS/scrambling sequence more dynamically.

It may be regulated that a predetermined subframe type or subframe configuration is used fixedly in a specific carrier. For example, a subframe type for a sidelink may always be used in an ITS dedicated band. In this case, the eNB or a synchronization reference UE may not transmit information about a subframe type. The eNB may signal only information about a subframe index to a UE.

Even though a cell implements a dynamic subframe format reconfiguration, the positions of sidelink subframes may be maintained as semi-statically configured. For example, such a configuration may be preconfigured semi-statically and sidelink subframes may be configured only at corresponding positions. In this case, the power consumption of a pedestrian UE (P-UE) may be reduced, relative to a case in which the P-UE reads the control information each time. The cell may indicate a selected one between this operation and the operation of changing the positions of sidelink subframes according to a dynamic reconfiguration. For example, a different operation may be selected for each resource pool, or according to a UE type, a service type, or a resource allocation scheme. For example, a method of configuring subframes semi-statically or a method of configuring subframes dynamically may be used for a sidelink according to the property of packets transmitted on the sidelink.

Subframe Type/Group-Related Subframe Indexing

The index of a first subframe may be the next index to the index of a subframe transmitted shortly before the first subframe, among subframes of a determined subframe type. For this purpose, the eNB may signal subframe indexes to be used for each subframe type or subframe group as well as the subframe type/group. Subframe numbers may be reindexed to virtual subframe numbers in (some) subframe types/groups. For example, subframes of a subframe group corresponding to a specific type may be reindexed with (a group or set of) subframe numbers. For example, subframes of each of subframe type A and subframe type B may sequentially be reindexed with a group (or set) of subframe numbers. In another method, suframes may be classified as sidelink subframes and cellular (UL/DL) subframes and reindexed, separately, irrespective of subframe types. A reindexed subframe number may be represented in M bits and signaled in a part of the REs of a DL control region. The signaling may be transmitted as a sequence obtained by mapping specific information to a sequence, or a codeword obtained by channel-encoding the specific information.

Such reindexed subframe indexes may be used for all/many operations in a subframe domain. In a specific example, a determined index may be used for determination of an HARQ ACK/NACK transmission subframe or CSI measurement. That is, a CSI feedback or an HARQ ACK/NACK feedback may be defined in a reindexed subframe for a cellular subframe. For example, when CSI is measured or a packet is received in an $n^{th}$ subframe and the CSI or A/N feedback is transmitted in an $(n+a)^{th}$ subframe, n+a is not based on an absolute subframe index but a reindexed subframe domain. Further, an HARQ retransmission may also be performed in a virtual index domain. Further, a determined index may be used for sidelink resource reservation. For example, when an SA is transmitted in an $n^{th}$ subframe and resources after (n+100) subframes are reserved, the (n+100) subframes may be reindexed subframes. Further, the determined index may be used for generating an RS sequence or a scrambling sequence. For example, the RS sequence may be changed based on a virtual subframe number. In this method, all operations may be performed based on virtual subframe indexes irrespective of physical subframe indexes. This operation is UE-commonly performed. A UE may perform an operation in a corresponding subframe by identifying a subframe type/group and subframe index signaled in a current subframe.

Further, the result of measurement at a first UE may be used for the next index to the determined index. Specifically, since the result of a sensing operation (interference signal, SNR measurement, and so on) on a sidelink or UL/DL is used only in the virtual index domain, the sensing result may still be used even through a subframe type is dynamically changed. Even though the subframe type is changed in the middle, the UE may stably use an interference measurement later in the virtual index domain.

Although virtual subframe indexes are used as described above, absolute subframe indexes (e.g., subframe indexes prior to reindexing to virtual subframe indexes) may be used to generate an RS sequence or a scrambling sequence for a control signal (PDCCH, PBCH, or the like). That is, for a signal that every UE should listen to before getting knowledge of virtual subframe numbers, an RS/scrambling sequence is generated using an absolute subframe index, and after the UE gets the knowledge of the virtual subframe numbers, an RS/scrambling sequence is generated using a virtual subframe number.

Subframe types/groups or subframe indexes of a specific cell may be signaled to another cell over a backhaul network. This operation is performed for the purpose of conducting sidelink communication between UEs in different cells or receiving a signal from another cell without fail. In case a UE fails to receive the subframe types or indexes of a specific cell due to the near far effect (a phenomenon of failing to receive a signal from another neighboring cell due to too a strong signal from a neighboring cell), the subframe types/groups or indexes of the neighboring cell are signaled together. A macro cell may transmit information about these subframe types/groups. The macro cell operating in a low band signals information about subframe types of small cells within the coverage of the cell.

A UE may autonomously determine a virtual index in a subframe type/group that it transmits. For example, although the eNB indicates the virtual index of a DL signal, the UE may increment an index only when the UE transmits a signal. In this case, the UE may transmit a subframe index used by it in a part of a UL control region. In this manner, the UE may generate an RS/scrambling signal by changing a subframe index irrespective of the position of a physical subframe in which the UE actually performs transmission. This method allows the UE to determine a subframe index even in the case of subframe type B illustrated in FIG. 10. Along with this method, the UE may perform a retransmission for its determined subframe index. That is, the UE increments a subframe index in a specific subframe type, and performs a retransmission in a corresponding subframe when a subframe index for the retransmission comes.

If the UE fails to receive a subframe type/group indication or a subframe index in a specific subframe, the UE may fall back on a preset semi-static configuration. For the fallback operation, an operation of semi-statically configuring a subframe configuration and changing the subframe configuration midway on a subframe basis by the eNB may be considered.

A subframe index may be referred to as a counter. That is, a counter represents the virtual index of a subframe in which a transmission entity (UE or eNB) performs its transmission.

If the afore-described first UE is an out-coverage UE, a UE that transmits a synchronization signal may transmit an indication indicating the subframe type of the first subframe among a plurality of subframe types. Further, K subframes previous to the first subframe may carry a PSBCH. That is, in out-coverage, a UE transmitting a synchronization signal or a UE selected as the head of a cluster may transmit a signal that determines a subframe type or a subframe index. This information may be transmitted only in a subframe carrying the PSBCH, thereby reducing overhead. In out-coverage, a specific subframe type or group may be fixedly used. Since this type or group is used for a sidelink without UL/DL, the type or group for the sidelink may be fixedly configured.

In partial coverage, an in-coverage UE that transmits a synchronization signal may transmit subframe type or subframe index information. Although the subframe type or subframe index information may be transmitted in each subframe as described before, the subframe type or subframe index information may be transmitted only when the synchronization signal is transmitted, or only in a subframe carrying the PSBCH.

If this method is used for a sidelink subframe configuration, a receiving UE or a UE that intends to transmit a message in every predetermined period has no accurate knowledge of a time when a sidelink subframe comes after X ms, and thus may have to wake up in each subframe to receive subframe type/index information. To solve the problem, the eNB may signal an average subframe type ratio to the UE by physical-layer signaling or higher-layer signaling. For example, the eNB may signal the average number of subframe types a within N ms or the upper/lower bound of the ratio such that transmitting and receiving UEs may predict how many ms later the corresponding subframe type actually appears.

In another method, if the eNB has signaled a subframe type and subframe index of a short period, the eNB may signal a subframe type and/or subframe index of a long period by physical-layer signaling or higher-layer signaling. For example, the eNB may signal an index estimate per subframe type during upcoming X ms or the upper or low bound of the index estimate every X ms (e.g., X=100). The UE may predict the number of allocated subframes for each subframe type within upcoming X ms based on the signaling.

The above description may be applied to UL or DL, not limited to direct communication between UEs, and an eNB or a relay may adopt the proposed methods.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

Apparatus Configurations According to Embodiment of the Present Disclosure

Figure 15:
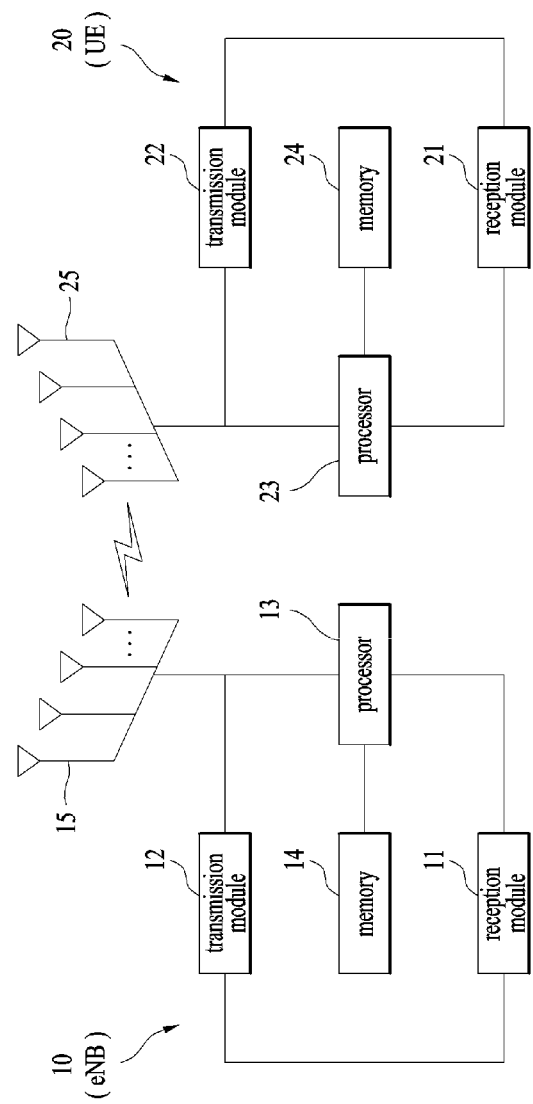
FIG. 15 is a block diagram illustrating a transmission apparatus and a reception apparatus.

FIG. 15 is a block diagram of a transmission point and a UE according to an embodiment of the present disclosure.

Referring to FIG. 15, a transmission point 10 according to the present disclosure may include a receiver 11, a transmitter 12, a processor 13, a memory 14, and a plurality of antennas 15. Use of the plurality of antennas 15 means that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10.

The processor 13 of the transmission point 10 according to an embodiment of the present disclosure may process requirements for each of the foregoing embodiments.

Besides, the processor 13 of the transmission point 10 may function to compute and process information received by the transmission point 10 and information to be transmitted to the outside. The memory 14 may store the computed and processed information for a predetermined time, and may be replaced by a component such as a buffer (not shown).

With continued reference to FIG. 15, a UE 20 according to the present disclosure may include a receiver 21, a transmitter 22, a processor 23, a memory 24, and a plurality of antennas 15. Use of the plurality of antennas 25 means that the UE 20 supports MIMO transmission and reception. The receiver 21 may receive various DL signals, data, and information from an eNB. The transmitter 22 may transmit various UL signals, data, and information to an eNB. The processor 23 may provide overall control to the UE 20.

The processor 23 of the UE 20 according to an embodiment of the present disclosure may process requirements for each of the foregoing embodiments. Specifically, the processor may determine the subframe type of a first subframe from among a plurality of subframes and perform one of UL transmission and DL reception in a UL resource or a DL resource according to the determined subframe type. The subframe type of the first subframe among the plurality of subframe types may be indicated by each of K (K>1) subframes earlier than the first subframe by L (L>0) subframes, and each of the K subframes may indicate the subframe types of K subframes after L subframes among the plurality of subframe types.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted.

In the example of FIG. 15, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various mobile communication systems.

The invention claimed is:

1. A method of performing transmission or reception in a subframe by a first user equipment (UE) in a wireless communication system, the method comprising:
   determining a subframe type of a first subframe from among a plurality of subframe types; and
   performing one of uplink transmission and downlink reception in an uplink resource or a downlink resource according to the determined subframe type,
   wherein the subframe type of the first subframe among the plurality of subframe types is indicated by each of K (K>1) subframes earlier than the first subframe by L (L>0) subframes, and each of the K subframes indicates the subframe types of K subframes after L subframes among the plurality of subframe types.

2. The method according to claim 1, wherein an index of the first subframe is determined to be a next index to an index of a transmitted subframe shortly previous to the first subframe among subframes of the determined subframe type.

3. The method according to claim 2, wherein a measurement result of the first UE is also used in a next index to the determined index.

4. The method according to claim 2, wherein the determined index is used to determine a hybrid automatic repeat request (HARQ) acknowledgment/negative acknowledgment (ACK/NACK) transmission subframe.

5. The method according to claim 2, wherein the determined index is used to reserve sidelink resources.

6. The method according to claim 2, wherein the determined index is used to generate a reference signal sequence or a scrambling sequence.

7. The method according to claim 1, wherein if the first UE is an out-coverage UE, a UE transmitting a synchronization signal transmits an indication indicating the subframe type of the first subframe among the plurality of subframe types.

8. The method according to claim 7, wherein the indication is transmitted on a physical sidelink broadcast channel (PSBCH).

9. The method according to claim 8, wherein the PSBCH is transmitted in the K subframes earlier than the first subframe by L subframes.

10. The method according to claim 1, wherein each of the plurality of subframe types includes two or more of a downlink resource region, an uplink resource region, a downlink control information region, an uplink control information region, and a guard period.

11. The method according to claim 1, wherein each of the plurality of subframe types has a different subframe structure.

12. The method according to claim 1, wherein information indicating the subframe type of the first subframe is transmitted in one or more resource elements (REs) of the K subframes earlier than the first subframe by L subframes.

13. A first user equipment (UE) for performing transmission or reception in a subframe in a wireless communication system, the first UE comprising:
   a transmitter and a receiver; and
   a processor,
   wherein the processor is configured to determine a subframe type of a first subframe from among a plurality of subframe types, and to perform one of uplink transmission and downlink reception in an uplink resource or a downlink resource according to the determined subframe type, and
   wherein the subframe type of the first subframe among the plurality of subframe types is indicated by each of K (K>1) subframes earlier than the first subframe by L (L>0) subframes, and each of the K subframes indicates the subframe types of K subframes after L subframes among the plurality of subframe types.

14. The UE of claim 13, wherein the first UE is included in an autonomous vehicle.

* * * * *